Nov. 19, 1968 P. BABICIU ET AL 3,411,719
CENTRIFUGAL DISTRIBUTOR FOR FERTILIZER AND OTHER
MATERIALS IN POWDER OR GRANULES
Filed Dec. 30, 1964 6 Sheets-Sheet 1

INVENTORS:
PAVEL BABICIU
GHEORGHE FIEGER
RUDOLF ATTAHAL
NICOLAIE GHEORGHE
RADU NICOLAIE
BY Arthur O. Klein
ATTORNEY INVENTORS:
PAVEL BABICIU
GHEDRGHE FIEGER
RUDOLF ATTAHAL
NICOLAIE GHEDRGHE
RADU NICOLAIE
BY
Arthur O. Klein
ATTORNEY

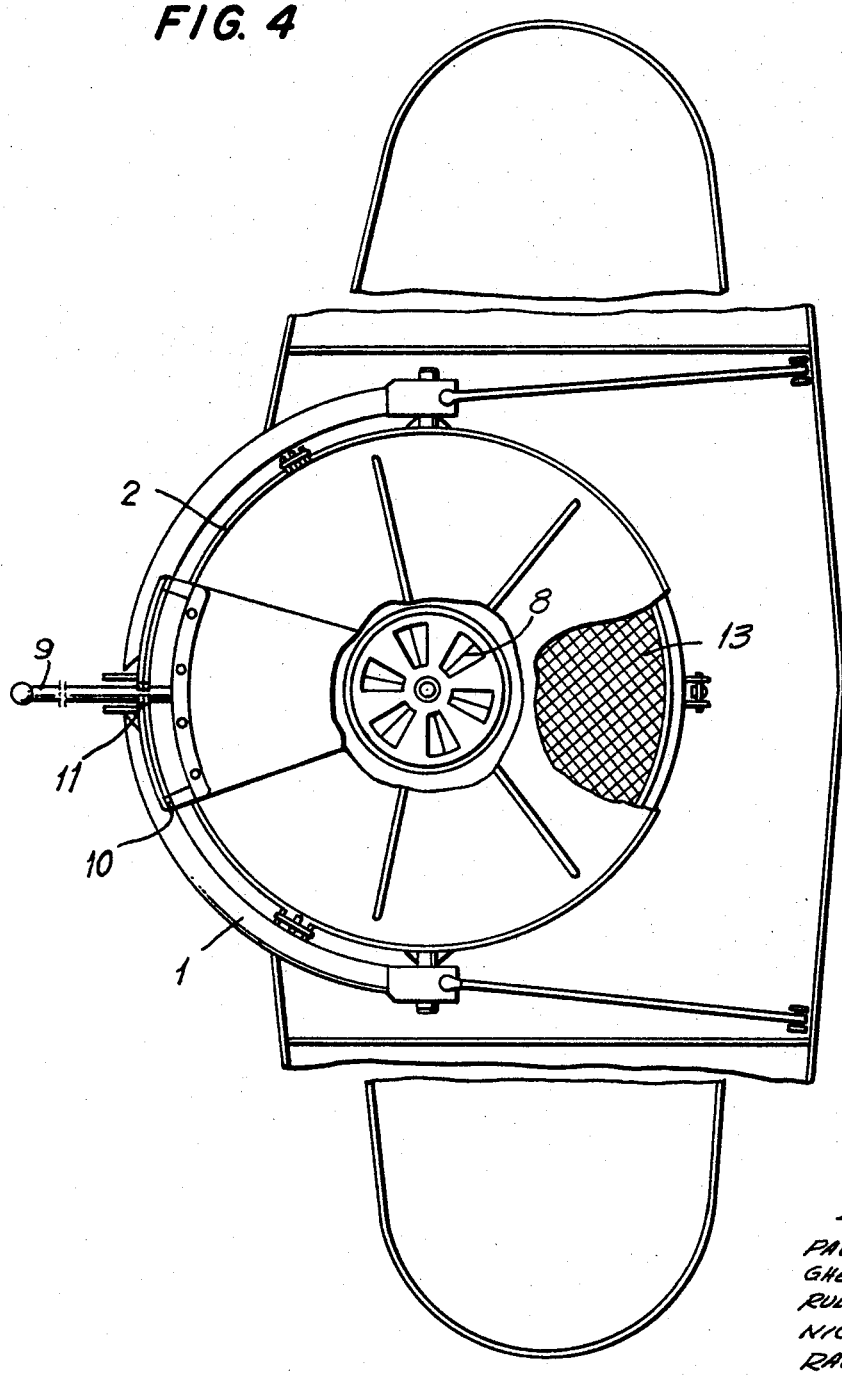

United States Patent Office 3,411,719
Patented Nov. 19, 1968

3,411,719
CENTRIFUGAL DISTRIBUTOR FOR FERTILIZER AND OTHER MATERIALS IN POWDER OR GRANULES
Pavel Babiciu, Gheorghe Fieger, Rudolf Attahal, Nicolaie Gheorghe, and Radu Nicolaie, Bucharest, Rumania, assignors to Ministerul Industriei Constructiilor de Masini, Bucharest, Rumania
Filed Dec. 30, 1964, Ser. No. 422,154
9 Claims. (Cl. 239—667)

The invention refers to a centrifugal distributor for fertilizers and other materials in powder or granules; the distributor achieves a high degree of evenness of spread on the ground and a steady flow of the material from the hopper even with material of high moisture content in powdered condition and at low flow rates.

Mineral fertilizer distributors are known which are working either on the tray distribution principal or on the centrifugal principle.

The various centrifugal distributors on the market consist generally of a feeding hopped, an agitator device for the fertilizer, a distributor and one or more throwing disc which by their rotation spread the fertilizer.

The centrifugal distributors which have been built up to the present, achieve a higher productivity than tray distributors, are lighter and easily operated, but they have one drawback namely that they do not ensure the evenness of distribution required by the exacting conditions of present day agriculture. Also, in the case of fertilizers in powdered form, they do not achieve either the small flow rates which are required, or the continuous flows from the hopper of fertilizers with normal moisture content; this may lead even to the powdered material getting into a pasty condition. Such distributors have the hopper fixed on the frame and are provided with various types of agitators fitted inside the hopper; the agitators turn with the speed of the thrower or with a different speed. On certain distributors the agitator's speed may be adjusted to suit each particular fertilizer. These agitators lead to a complicated gearing without however ensuring a uniform flow of the fertilizer from the hopper and without preventing the material getting into a pasty condition.

In order to obtain the desired application rate, the machines are equipped with a metering device which is provided with lateral slots which are adjustable as regards size and position, and also with various devices for directing the fertilizer through the slots, most of these devices are highly complicated; they are driven through the throwing discs axle and they do not ensure the small flow rates which are required.

There exist also distributors equipped with a vibrating trough located under the metering head below the hopper and where the fertilizers are mixed and directed to the horizontal throwing disc. Since the cause of the non-uniform flow from the hopper is not removed by the metering head, the throwing disc feeding is not uniform, even when it is effected through the vibrating trough.

The throwing discs of the existing centrifugal distributors are generally of a simple design, with equal radial blades, straight or curved; for this reason the evenness of spread achieved with such discs is low and the distribution curve shows two symmetrical peaks with respect to the direction of motion of the distributor.

There are also centrifugal distributors provided with several throwing discs of the same diameter, located at different levels, and in positions which are not co-axial; however, an efficient overlapping of application zones is not achieved since the distribution areas of the throwers placed at different levels differ theoretically very little and are practically the same so that finally the peak of the spreading curve of one thrower overlaps the peaks of another disc.

The distributor according to the present invention obviates the drawbacks mentioned above and supplies the throwing disc with a steady and uniform flow of material; the hopper provided at its lower end with a metering head with adjustable slots, is vibrated with a frequency equal to the speed of rotation of the disc; the amplitude of the vibration is small while the axis of the oscillatory movement is facing the centre of gravity; thus, there is no need for an agitator fitted inside and metering heads with driving mechanisms which promote a pasty condition of the fertilizer.

In order to assure a better evenness of fertilizer particles application, the distributor is equipped with a throwing disc provided with sets of blades of different lengths and slants, placed on different throwing cones which project with different centrifugal forces, different amounts of material, at different distances; owing to the coaxial overlapping of the spreading action of all the blades, a uniform layer of material is spread, over the whole central part of the strip of material laid on each pass, while by the superposition of the strip ends of two successive passes a uniform layer of material is obtained over the whole surface.

In order to achieve a vibratory motion of the hopper, the latter is fastened on the machine frame by means of two coaxial bearings facing the hopper gravity centre which is thus balanced; the lower part of the hopper is acted on by a mechanism provided with an eccentric and connecting rod which causes an oscillating rotational motion round the bearing axis. The eccenter is fixed on the throwing disc axis while the connecting rod is attached on the body of the eccentric axis bearing by means of a joint which allows the motion in a vertical plane, and to the hopper by means of a spherical point.

The metering head consist of two superposed discs provided with slots; the discs may be rotated one with respect to the other by means of a handle which may be set in any desired position on a flow scale; slots of various sizes corresponding to the flow required are thus obtained; the device is located on the lower part of the hopper and is vibrated together with it, ensuring a continuous flow of material from the hopper.

The material which has passed through the metering head is directed by a funnel which is attached to the hopper under the metering head and which is provided with a curved spout located eccentrically with respect to the disc center, and which can be turned in different positions with reference to the bunker's axis; thus the direction of throwing the material may be adjusted.

The throwing disc provided with sets of blades of different lengths and slants is characterized by the fact that the larger blades impart to the particles higher initial velocities, under a larger angle with respect to the horizontal, over a longer working area; the medium sized blades impart to the particles lower initial velocities under a smaller angle with respect to the horizontal, spreading the fertilizer over a smaller working area, while the small blades impart to the particles still smaller initial velocities and smaller angles with respect to the horizontal (the angle may take even negative values, i.e. inclined downwards with reference to the horizontal), spreading the fertilizer over a still smaller working area. The blades are disposed with respect to the feeding inlet in such a way that the larger blades spread most of the material, the medium sized blades a smaller amount, and the small sized blades a still smaller amount of material.

In order to achieve coaxiality of the working fronts, the angle between the tangent to the blade's end and the corresponding radial direction is larger for the small sized blades, smaller for the medium sized blades, and smallest for the large sized blades.

The following example illustrates how the invention may be applied:

FIG. 4 is a plane schematic view of the machine.

Figure 3A:
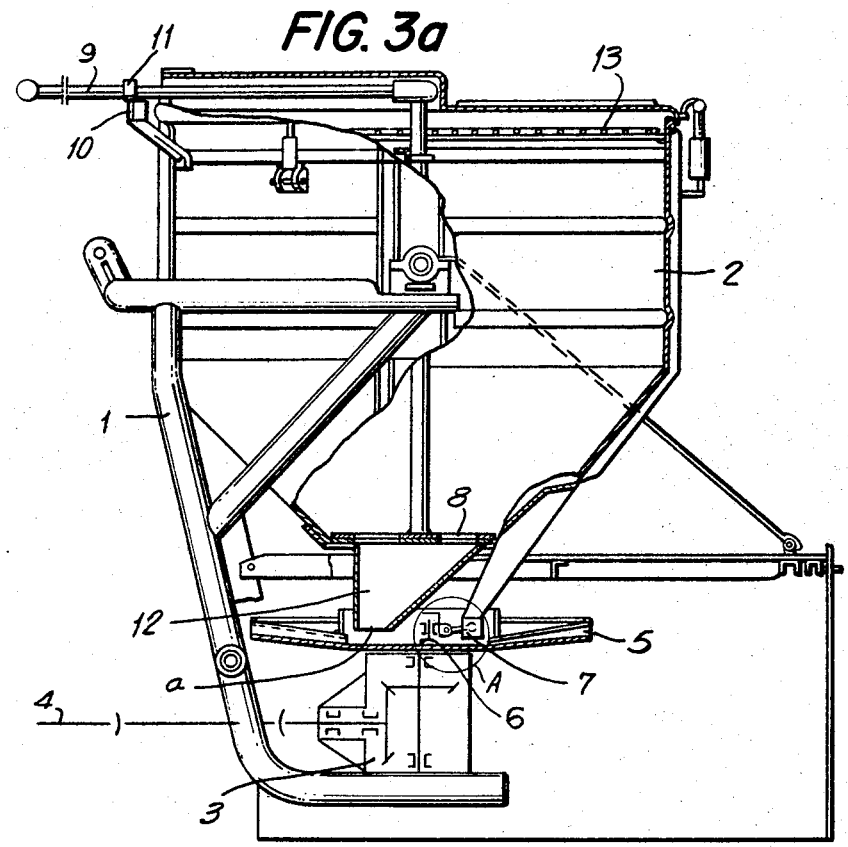
FIG. 3a is a lateral schematic side view partially in section of the machine.
Figure 3B:
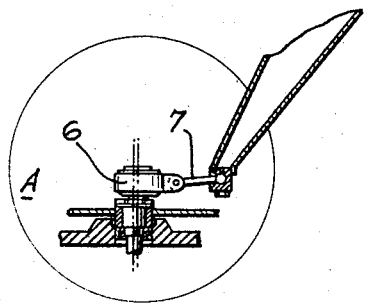
FIG. 3b is a detailed side view in a larger scale of the eccentric driving means of the centrifugal fertilizer distributor of the invention.

The centrifugal fertilizer distributor according to the invention (FIGS. 3 and 4), consists of a frame 1, provided on the upper side with two bearings for the axles of the hopper 2; the axles are coaxial and pass through the centre of gravity of the hopper. On the lower side of the frame is attached the gear box 3 which is driven by the tractor through the universal joint 4, and which drives the throwing disc 5. On the throwing disc axle is fastened the eccentric 6 which imparts to the hopper by means of the connecting rod 7 a vibratory motion the frequency of which corresponds to the speed of the disc, the vibratory motion ensures a steady flow of material from the hopper. The fertilizer rate is set by means of the metering head 8 the slots of which are adjusted by the handle 9; the handle is moved in front of the scale 10, and fastened to the slider 11 and may be locked in any desired position on the graduated rule of the indicator 10. The fertilizer, after leaving the metering head 8 is directed through the funnel 12 to the lower part of the throwing disc 5 through an elongated slot having a circular form. The position of the feeding slot a may be adjusted by turning the funnel 12 round the hopper axle and locking it in the desired position.

The upper side of the hopper 2 is provided under the lid with a wire screen 13 which retains foreign matter and large lumps of material, thus preventing a possible clogging of the machine.

Figure 5:
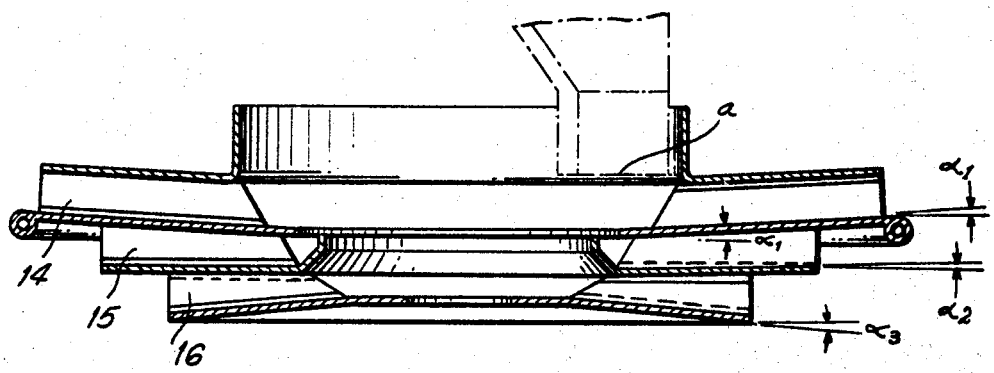
FIG. 5 is a cross section through the throwing disc, first variant.
Figure 6:
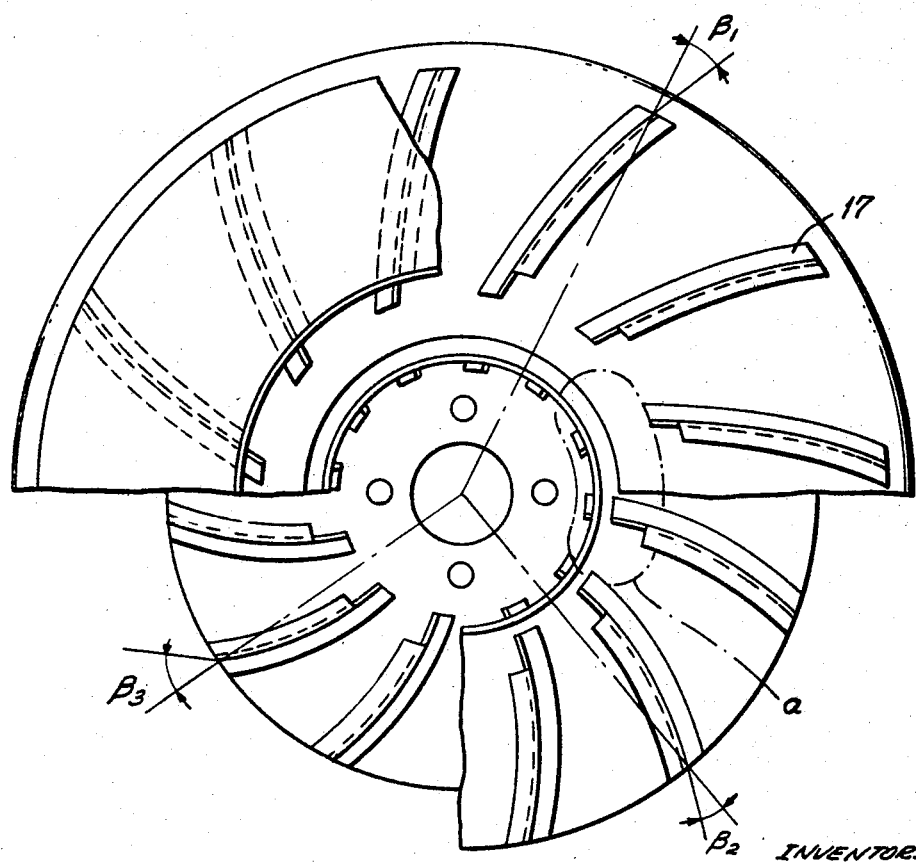
FIG. 6 is a plane view through the throwing disc, first variant.

The throwing disc, variant 1 (FIGS. 5 and 6), consists of three superposed discs 14, 15 and 16, of successively smaller diameter and forming a single body. Each disc is provided with blades 17 whose angles with the radii and a horizontal plane ensure the highest throwing efficiency. The feeding slot a is positioned with respect to the discs so as to supply the larger disc with the largest amount of material, the medium sized disc with a smaller amount and the little disc with the smallest amount of material. The compound throwing disc achieves the spreading in three coaxial layers of different widths and spreads a uniform thickness of the material as shown on the diagrams (FIGS. 1 and 2).

Figure 7:
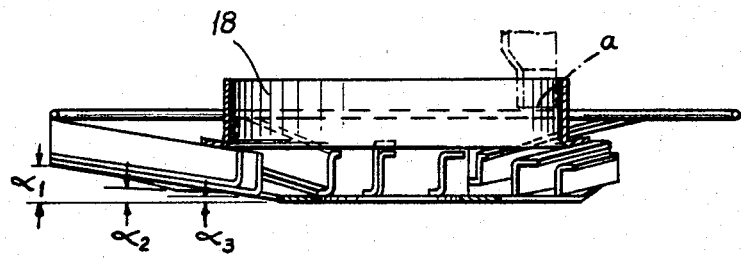
FIG. 7 is a cross section through the throwing disc, second variant.
Figure 8:
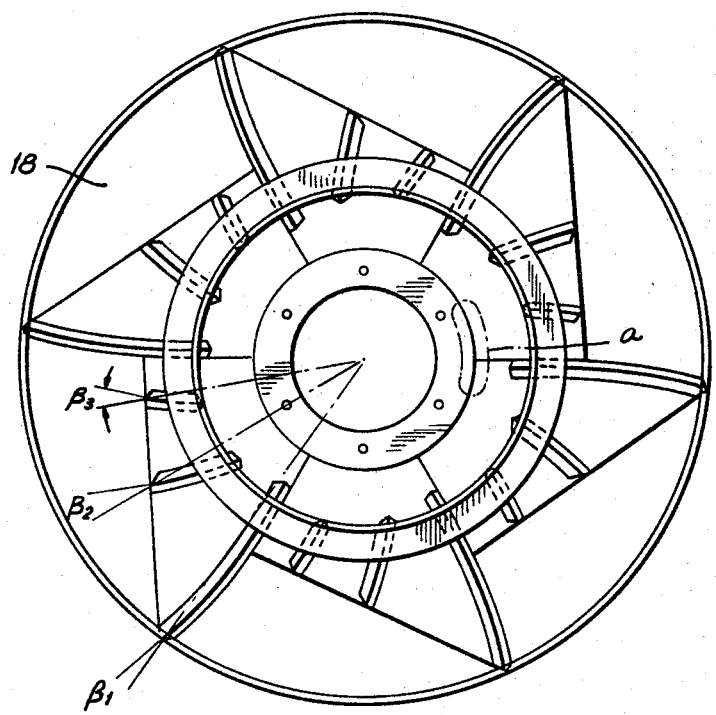
FIG. 8 is a plane view through the throwing disc, second variant.

A different, simpler variant of the throwing disc, according to the invention, is shown in FIGS. 7 and 8. The throwing disc is provided with inclined paddles; on each paddle are fastened a number of blades of different lengths. The longer blades are more inclined with respect to a horizontal plane than the shorter ones. The angle $\beta$ formed by the tangent at the end of the blade and the corresponding radius is larger for the short blades and smaller for the long blades; in this way the material is thrown in the same direction and the working areas are superposed coaxially although the blades have different lengths and the disc is fed from the same point. The longer blades have one of the ends nearer to the centre of the disc, than the shorter ones, so that the material which is discharged on the disc through the feeding outlet, is distributed in suitable different amounts on the blades of different lengths. The longer blades distribute a larger amount of fertilizer, the medium size a smaller amount and the shorter blades a still smaller amount.

Owing to the different lengths of the blades, of the different slanting angles and locations, the disc will achieve a multiple layer spreading of the material. The longer blades will act similarly to the disc with larger diameter and will throw a larger amount of material at a greater distance, the medium sized blades will act as a medium sized disc and will throw a smaller amount of material, at a different level, while the short blades will cover the smallest working area.

Figure 1:
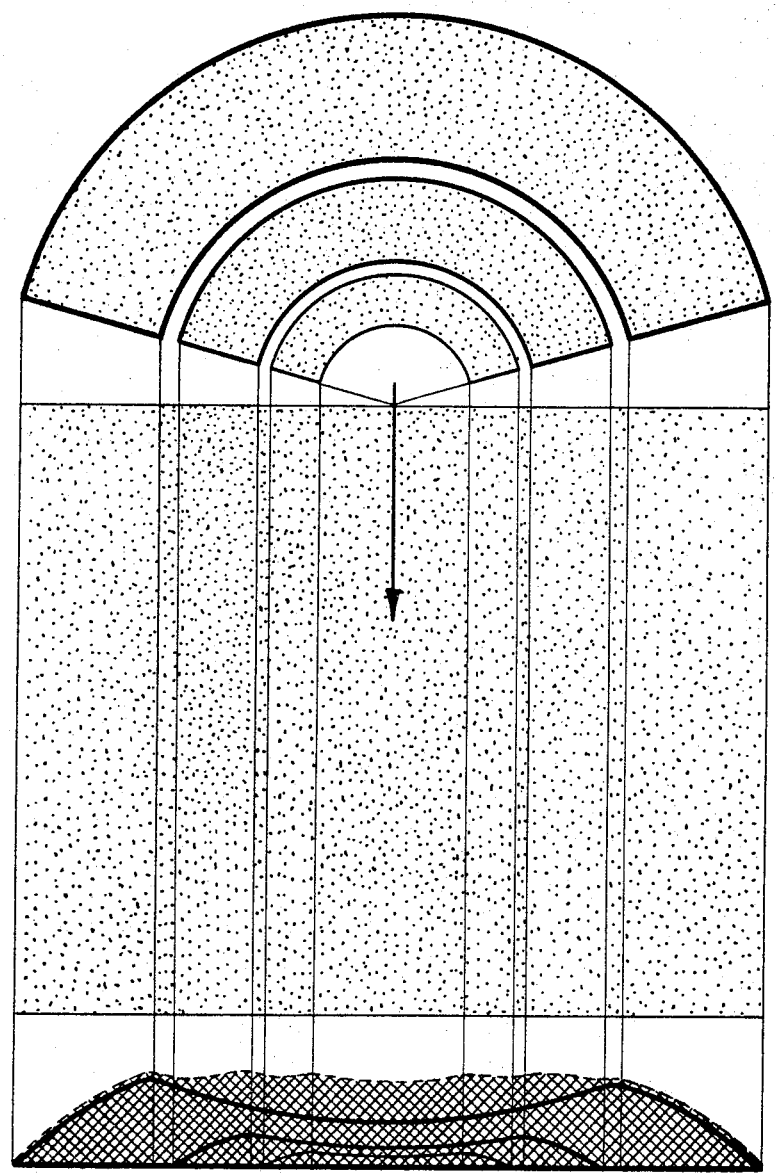
FIG. 1 shows the uniform layer of material spread in a single pass.
Figure 2:
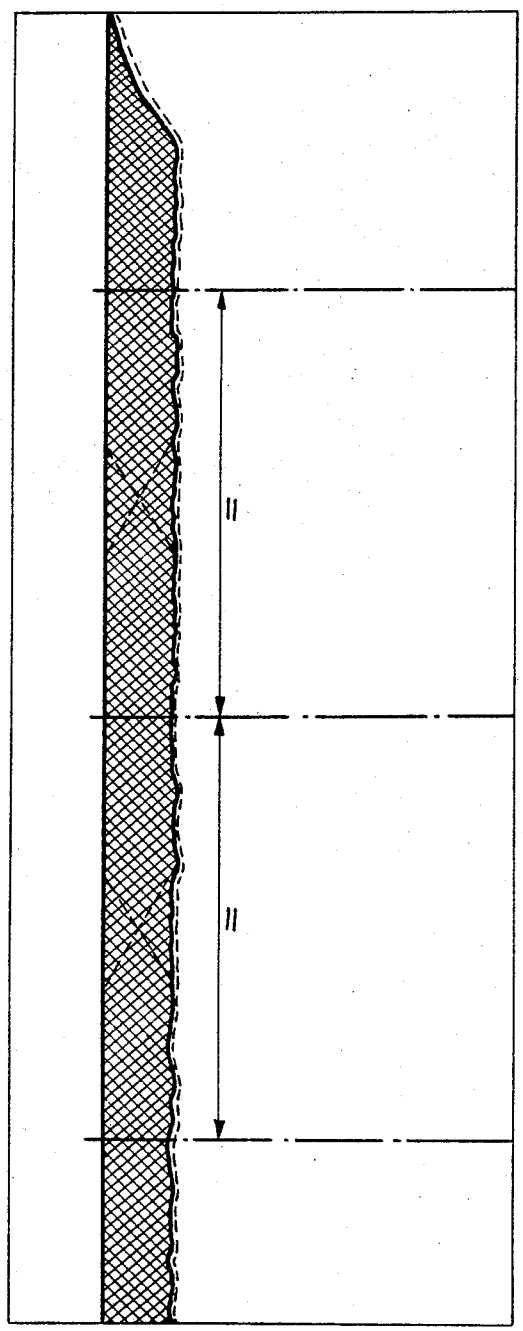
FIG. 2 shows the uniform layer of material spread in several successive passes.

The axial overlapping of the spreading action of the different blades effects a uniform distribution of the material as shown in the diagram of FIGS. 1 and 2.

Compared with other fertilizer distributors the machine according to the invention offers the following advantages:

It fulfills the most exacting requirements as regards uniform spreading, and the continuous flow of fertilizer from the hopper, even in the case of powder fertilizers with a high moisture content;

It allows the adjustment of the direction of spreading, and has a very high productivity;

The width of the strip of material laid in one pass is about one and a half larger than that of other centrifugal distributors;

The machine is of simple design and construction, low weight, while operation and maintenance are easy.

What is claimed is:

1. A centrifugal distributor for continuously dispersing granular, particulate or similar material, comprising in combination, a frame; hopper means mounted in said frame; rotatable horizontal dispersing means mounted underneath said hopper means; a funnel adjustably mounted at the outlet of said hopper means and adapted to distribute eccentrically with respect to the axis of said horizontal dispersing means material from said hopper means onto said horizontal dispersing means; vibrating means operatively connected to said hopper means for vibrating the latter; said horizontal dispersing means comprising a rotatably mounted shaft and a plurality of groups of blades of different lengths, inclinations with respect to the horizontal and curvatures connected thereto, the group of longest blades of said plurality of groups of blades being the most inclined with respect to the horizontal and having such a curvature that the angle formed by a tangent along the outermost point of a blade of said group of longest blades and a radius passing through said point from the axis of said horizontal dispersing means forms the smallest angle when compared with angles correspondingly formed by groups of shorter blades of said plurality of blades, the peripheral extremities of said group of longest blades defining a circle of maximum diameter which is located at the highest level in said horizontal dispersing means, said group of longest blades being adapted to accept the largest quantity of material from said funnel when compared with groups of shorter blades of said plurality of blades, the groups of shorter blades being less inclined with respect to the horizontal and having such a curvature that the angle formed by a tangent along the outermost point of a blade of said group of shorter lengths and a radius passing through said outermost point from the axis of said horizontal dispersing means forms an angle larger than said corresponding aforementioned smallest angle, and the peripheral extremities of said groups of shorter blades defining circles of smaller diameters at lower levels when compared with said circle of said group of longest blades; and motor means operatively connected to said rotatably mounted shaft for rotating the latter and to said vibrating means.

2. The centrifugal distributor as set forth in claim 1, including adjustable perforated plate means movably mounted between said hopper means and said funnel; adjusting means operatively connected to said perforated plate means and adapted to adjust the passage area therethrough.

3. The centrifugal distributor as set forth in claim 2, wherein said hopper means are reciprocally movably mounted in said frame about a horizontal axis, which substantially passes through the center of gravity of said hopper means; said vibrating means vibrating said hopper means about said horizontal axis.

4. The centrifugal distributor as set forth in claim 3, wherein said vibrating means comprise eccentric means connected to said rotatably mounted shaft; an auxiliary shaft swingably connected to said eccentric means about a substantially horizontal axis, said hopper means being connected to said auxiliary shaft by means of spherical connection means and being suspended on a pair of opposite bearings, which are supported by said frame; whereby said swingably mounted shaft imparts to said hopper means via said eccentric means and said auxiliary shaft a vibratory motion having a frequency substantially equal to the rotating frequency of said horizontal dispersing means.

5. The centrifugal distributor as set forth in claim 1, wherein the outlet opening of said funnel has two opposite sides in the shape of circular sectors, the center of which coincides with the vertical axis of said rotatably mounted shaft.

6. The centrifugal distributor as set forth in claim 5, wherein said rotatable horizontal dispersing means comprise a plurality of juxtaposed truncated right cones of different sizes, the vertical axes of which coincide with the vertical axis of said rotatably mounted shaft, each one of said plurality of groups of blades being mounted on one of said truncated right cones, the uppermost cone of said plurality of right cones having the smallest upper and lower diameter, and the lower-most cone of said plurality of right cones having the smallest upper and lower diameter, the smaller diameters of said juxtaposed truncated cones defining substantially horizontal circles, the areas of which partially overlap with said outlet opening of said funnel with respect to the vertical.

7. The centrifugal distributor as set forth in claim 5, wherein said rotatable horizontal dispersing means comprise a substantially star-shaped plate, the vertical axis of which coincides with the vertical axis of said rotatably mounted shaft, said star-shaped plate being divided into a plurality of equal sectors, which are inclined with respect to the horizontal.

8. The centrifugal distributor as set forth in claim 7, wherein on each one of said plurality of equal sectors there is mounted at least one blade of each group of said plurality of groups of blades, the inner end of the longest blade on said equal sector being closest to said vertical axis of said rotatably mounted shaft when compared with the corresponding distances of the shorter blades.

9. The centrifugal distributor as set forth in claim 8, wherein said star-shaped plate includes a circular opening, the center of which coincides with said vertical axis of said rotatably mounted shaft; the area of said circular opening partially overlaps with said outlet opening of said funnel with respect to the vertical.

References Cited
UNITED STATES PATENTS 2,562,422   7/1951   Herd _____ 275—8
2,594,084   4/1952   Skibbe et al. _____ 275—8

FOREIGN PATENTS

Ad. 23,478   1899   Great Britain.

ABRAHAM G. STONE, *Primary Examiner.*

J. R. OAKS, *Assistant Examiner.*